US012670464B2

(12) United States Patent
Schimmel

(10) Patent No.: US 12,670,464 B2
(45) Date of Patent: Jun. 30, 2026

(54) DISPOSITION OF ITEMS BASED ON ITEM IMAGE DATASETS

(71) Applicant: UNITED STATES POSTAL SERVICE, Washington, DC (US)

(72) Inventor: Todd M. Schimmel, Annandale, VA (US)

(73) Assignee: UNITED STATES POSTAL SERVICE, Washington, DC (US)

( * ) Notice: Subject to any disclaimer, the term of this patent is extended or adjusted under 35 U.S.C. 154(b) by 186 days.

(21) Appl. No.: 17/190,489

(22) Filed: Mar. 3, 2021

(65) Prior Publication Data

US 2021/0279679 A1 Sep. 9, 2021

Related U.S. Application Data

(60) Provisional application No. 62/985,039, filed on Mar. 4, 2020.

(51) Int. Cl.
*G06Q 10/0833* (2023.01)
*G06K 7/14* (2006.01)

(52) U.S. Cl.
CPC ....... *G06Q 10/0833* (2013.01); *G06K 7/1413* (2013.01)

(58) Field of Classification Search
CPC .................................................. G06K 7/1413
See application file for complete search history.

(56) References Cited

U.S. PATENT DOCUMENTS

| | | | | |
|---|---|---|---|---|
| 2012/0182588 A1* | 7/2012 | Mampe | .............. | G07B 17/0008 |
| | | | | 382/101 |
| 2016/0314608 A1* | 10/2016 | Dixon | .................... | G06F 3/1238 |
| 2017/0304872 A1* | 10/2017 | Dearing | .................. | B07C 7/005 |
| 2018/0122156 A1* | 5/2018 | Bentley | .................. | G06Q 10/08 |
| 2020/0233901 A1* | 7/2020 | Crowley | .............. | G06V 20/647 |
| 2021/0044424 A1* | 2/2021 | Desprez | .................. | G06T 7/337 |

OTHER PUBLICATIONS

X. Gao and L. Jin, "SwiftPost—A vision-based fast postal envelope identification system," 2009 IEEE International Conference on Systems, Man and Cybernetics, San Antonio, TX, USA, 2009, pp. 3268-3273, doi: 10.1109/ICSMC.2009.5346224. (Year: 2009).*

* cited by examiner

*Primary Examiner* — George Chen
*Assistant Examiner* — Tayar M Kyu
(74) *Attorney, Agent, or Firm* — MH2 Technology Law Group, LLP

(57) ABSTRACT

Systems and methods perform operations that include receiving information regarding an item; obtaining one or more digital images of the item; generating an image dataset, which may be unique, for the item based on the one or more digital images; storing information linking the image data set to the information regarding the item; receiving, from an item disposition system, a request to identify the item, wherein the request includes the image dataset for the item; identifying the item based on receiving the request and the image dataset; and providing, to the item disposition system, the information regarding the item to cause the item disposition system to disposition the item based on the information regarding the item.

20 Claims, 4 Drawing Sheets

200

210  Receive item information

220  Receive item image(s)

230  Generate unique image dataset for item

240  Generate serial number

250  Store information linking serial number with unique image dataset and item information

300

310    Obtain item image(s)

320    Generate unique image dataset for item

330    Output unique image dataset to item ID system

340    Receive item information linked to matching unique image dataset

350    Disposition item

DISPOSITION OF ITEMS BASED ON ITEM IMAGE DATASETS

CROSS-REFERENCE TO RELATED APPLICATIONS

This application claims the benefit of and priority to U.S. Provisional Patent Application No. 62/985,039 filed on Mar. 4, 2020, which is hereby incorporated by reference in its entirety.

BACKGROUND

A postage and/or delivery service provider may assign and print/place a tracking barcode on an item (e.g., a mail piece, deliverable mail package, etc.) for sorting, tracking, and/or other dispositioning actions involving the item. This barcode may include a florescent ID tag applied by mail processing equipment, may be separate from a shipping label, and may be used for internal sorting and tracking of the item within the service provider's internal operations.

SUMMARY

In one example aspect, a computer-implemented method includes receiving information regarding an item; obtaining one or more digital images of the item; generating a image dataset (which may be unique) for the item based on the one or more digital images; storing information linking the unique image data set to the information regarding the item; receiving, from an item disposition system, a request to identify the item, wherein the request includes the image dataset for the item; identifying the item based on receiving the request and the image dataset; providing, to the item disposition system, the information regarding the item to cause the item disposition system to disposition the item based on the information regarding the item.

In another example aspect, a computer program product includes a computer readable storage medium having program instructions embodied therewith. The program instructions are executable by a computing device to cause the computing device to perform operations including receiving information regarding an item; obtaining one or more digital images of the item; generating a image dataset (which may be unique) for the item based on the one or more digital images; storing information linking the unique image data set to the information regarding the item; receiving, from an item disposition system, a request to identify the item, wherein the request includes the image dataset for the item; identifying the item based on receiving the request and the image dataset; providing, to the item disposition system, the information regarding the item to cause the item disposition system to disposition the item based on the information regarding the item.

In another example aspect, a system includes a processor, a computer readable memory, a non-transitory computer readable storage medium associated with a computing device, and program instructions executable by the computing device. The program instructions cause the computing device to perform operations including receiving information regarding an item; obtaining one or more digital images of the item; generating a image dataset (which may be unique) for the item based on the one or more digital images; storing information linking the unique image data set to the information regarding the item; receiving, from an item disposition system, a request to identify the item, wherein the request includes the image dataset for the item; identifying the item based on receiving the request and the image dataset; providing, to the item disposition system, the information regarding the item to cause the item disposition system to disposition the item based on the information regarding the item.

DETAILED DESCRIPTION

Figure 1:
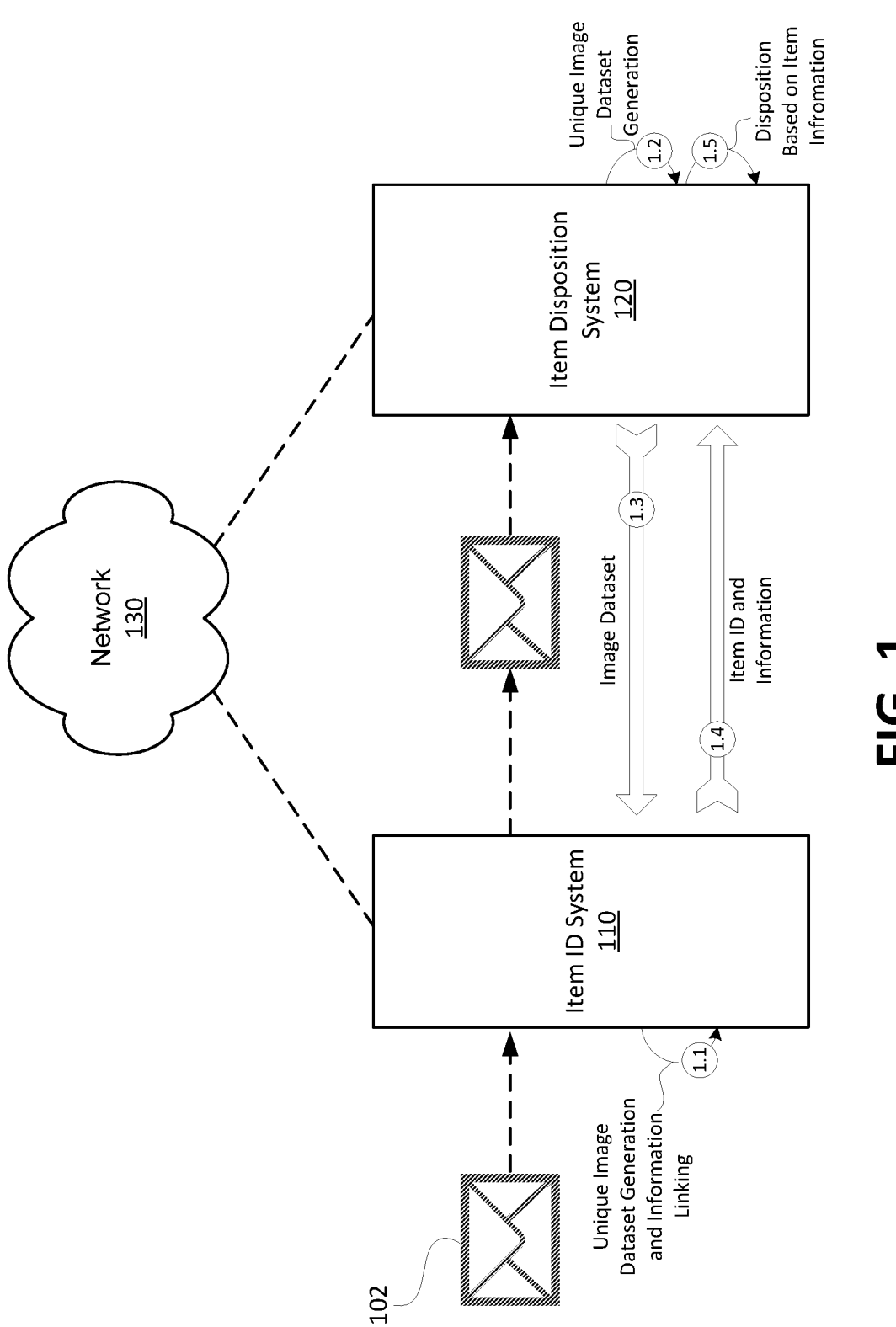
FIG. 1 illustrates an overview of an example implementation and environment in accordance with aspects of the present disclosure.

Certain embodiments of the disclosure will hereafter be described with reference to the accompanying drawings, wherein like reference numerals denote like elements. It should be understood, however, that the accompanying drawings illustrate only the various implementations described herein and are not meant to limit the scope of various technologies described herein. The drawings show and describe various embodiments of the current disclosure.

Florescent ID tags may be applied to items (e.g., mail pieces, deliverable mail packages, etc.) for internal sorting/tracking within the internal operations of a postage and/or package delivery service provider. However, the printing and placement of such tags may involve the use of elaborate, sophisticated, and expensive equipment. For example, florescent ID tag printers and readers are required to implement such systems. Accordingly, aspects of the present disclosure eliminate the need for florescent ID tags altogether in the dispositioning of items (e.g., tracking, sorting, etc. of the items).

As described in greater detail herein, aspects of the present disclosure may include a system and/or method that generates an image dataset (which may be unique) for an item that uniquely identifies the item, and uses this image dataset in place of a florescent ID tag. In this way, the need for equipment for producing, printing, placing, and reading florescent ID tags may be eliminated. That is, the image dataset may be used to identify the item such that the item can be properly dispositioned (e.g., sorted, tracked, updated with current information, etc.).

As described herein, the image dataset (which may be unique) may include a set of information derived from one or more images of the item. For example, the one or more images of the item may be translated by an algorithm or function into a set of data representing the original images. As one example, a finite state machine may be used to generate a unique image dataset based on one or more input images of the item. As another example, pixels in the one or more images may be translated to a set of values based on the pixel locations, colors, arrangement, etc. As another example, a hash function may be applied to the one or more images for conversion into a hash value. Additionally, or alternatively, any other function maybe used to translate the one or more images of the item into a set of data representing the one or more images. Once the image dataset has been generated, the image dataset may be centrally stored for future identification of the item (e.g., as the item travels through the service provider's system in connection with item delivery). In order to later identify the item (e.g., at a later stage in delivery), one or more images of the item may be captured, the image dataset may be created, and the image dataset may be output to a central system. The central system may match the received image dataset to the corresponding image dataset previously generated and stored.

As described herein, an image dataset for an item may uniquely identify the item even in a situation in which different items (e.g., mail pieces, packages, etc.) may appear visually similar to each other (e.g., have similar or even identical colors, size, dimensions, etc.). For example, digital images of these different items have sufficient variation such that even a slight difference result in unique image datasets for each item. As an example, in a situation in which two items may appear identical (e.g., same shape, dimensions, color), high-resolution digital images may capture miniscule differences between the two items such that their unique image datasets differ. Further, in the case of package delivery, similar items may have shipping labels with different information (e.g., recipient names, addresses, tracking numbers, etc.). Thus, digital images of these items with different shipping labels will result in different unique image datasets. As such, the use of unique image datasets may be used to accurately identify and differentiate one item from another. Also, in one or more alternative embodiments, additional information may be used in conjunction with a unique image dataset to identify the item. For example, the item weight's (e.g., as determined by a scale) or dimensions (e.g., as determined by a measuring system) may be used as part of item identification along with the unique image dataset.

In embodiments, the image dataset (which may be unique) may be linked to any variety of data or information associated with the item (e.g., weight, dimensions, sorting information, tracking information, delivery status information, origin/destination information, delivery route information, sender/recipient information, etc.). As the item travels through the service provider's system in connection with delivery, the item may be identified using the unique item image dataset, and dispositioned accordingly. Further, additional information regarding the item's status may be updated and linked to the item's unique image dataset. In this way, all delivery, tracking, and/or sorting systems involved with the item's delivery may use the most up-to-date information regarding the item.

Embodiments of the disclosure may include a system, a method, and/or a computer program product at any possible technical detail level of integration. The computer program product may include a computer readable storage medium (or media) having computer readable program instructions thereon for causing a processor to carry out aspects of the present disclosure.

FIG. 1 illustrates an overview of an example implementation and environment in accordance with aspects of the present disclosure. As shown in FIG. 1, environment 100 includes an item ID system 110, an item disposition system 120, and a network 130.

In various embodiments, the item ID system 110 may include one or more computing devices that generates and stores an image dataset for an item, which is preferably a unique image dataset (e.g., item 102). Further, the item ID system 110 may store information linking the unique image dataset to a serial number or identifier, and to any variety information that may be used in connection with item disposition (e.g., sorting, tracking, etc.). As described in greater detail herein, the item ID system 110 may identify an item for an item disposition system 120 and provide the item disposition system 120 with the information linked to the identified item. In some embodiments, the item ID system 110 may be a centralized server that centrally stores unique image datasets for identification of items.

The item disposition system 120 may include one or more computing devices that receives an item (e.g., item 102), and communicates with the item ID system 110 to identify the item and its associated information using the item's unique image dataset. Once the item has been identified, the item may be dispositioned accordingly based on the item's details and information. Example item disposition may include determining and/or providing sorting procedures, determining and/or providing location tracking information, updating status information regarding the item, providing rerouting information for the item, updating a service feature for the item (e.g., delivery speed, signature confirmation), etc.

The network 130 may include network nodes and one or more wired and/or wireless networks. For example, the network 130 may include a cellular network (e.g., a second generation (1G) network, a third generation (3G) network, a fourth generation (4G) network, a fifth generation (1G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, the network 130 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks. In embodiments, the network 130 may include copper transmission cables, optical transmission fibers, wireless transmission, routers, firewalls, switches, gateway computers and/or edge servers.

The quantity of devices and/or networks in the environment 100 is not limited to what is shown in FIG. 1. In practice, the environment 100 may include additional devices and/or networks; fewer devices and/or networks; different devices and/or networks; or differently arranged devices and/or networks than illustrated in FIG. 1. Also, in some implementations, one or more of the devices of the environment 100 may perform one or more functions described as being performed by another one or more of the devices of the environment 100. Devices of the environment 100 may interconnect via wired connections, wireless connections, or a combination of wired and wireless connections.

As further shown in FIG. 1, at step 1.1, the item ID system 110 may generate a unique image dataset for an item (e.g., pt102). In some embodiments, the item ID system 110 may generate the unique image dataset based on one or more images of the item and a function that translates the one or more item images into a set of values corresponding to the one or more item images. In some embodiments, the one or more images of the item may be captured at a service or processing station that initially accepts the pt102 for delivery. For example, the one or more images may be captured at a conveying system, a work surface, open space, etc., (e.g., in conjunction with item acceptance or item registration into a tracking system). The item ID system 110 may store the unique image dataset along with an ID of the item and information linked to the item (e.g., weight, dimensions, sorting information, tracking information, delivery status information, origin/destination information, delivery route information, sender/recipient information, etc.).

As the item 102 travels towards its destination, the item 102 may be received by a service, processing, and/or sorting station, which may implement an item disposition system 120. The item disposition system 120 may communicate with the item ID system 110 to identify the received item 102. For example, at step 1.2, the item disposition system 120 may generate a unique image dataset for the pt102 by capturing one or more images of the item 102 and applying a function to translate the one or more images to a set of values representing the item 102 (e.g., similar to the process at step 1.1). At step 1.3, the item disposition system 120 may provide the image dataset to the item ID system 110. The item ID system 110 may match the received image dataset to the item ID and the information linked to the item ID and, at step 1.4, the item ID and corresponding linked information is provided to the item disposition system 120. At step 1.5, the item disposition system 120 may disposition the item based on the ID of the pt102 and its corresponding information. In some embodiments, dispositioning of the item may include sorting the item in a particular manner or location, rerouting the item, providing tracking information of the item, updating the status of the item, etc. The manner in which the item is dispositioned may be based on a set of rules that define the item's disposition based on the item's information (e.g., size, weight, routing path, origin, destination, etc.).

In some embodiments, each service, processing, and/or sorting station of a postage/item delivery service provider may include an item disposition system 120 to identify and disposition an item that is received and processed at the item disposition system 120 as part of item delivery. That is, as the item 102 travels to different service stations, each item disposition system 120 may communicate with the item ID system 110 to uniquely identify the item based on the item's unique image dataset, and disposition the item accordingly. As described herein, dispositioning of the item may include updating the item's status record with updated information, which may be centrally stored in the item ID system 110.

By using an image dataset, the pt102 may be identified without the need for a separate tag, fluorescent ID tag, or other type of indicia, label, etc. As previously discussed, such identification techniques eliminate the need for expensive and sophisticated equipment used to read fluorescent ID tags. Further, information regarding the pt102 may be quickly accessed for proper dispositioning, sorting, tracking, etc.

In some embodiments, aspects of the present disclosure may be used in any variety of systems in addition to mail/package delivery systems. For example, aspects of the present disclosure may be used to track items in a warehouse, an inventory tracking system, or other type of environment.

Figure 2:
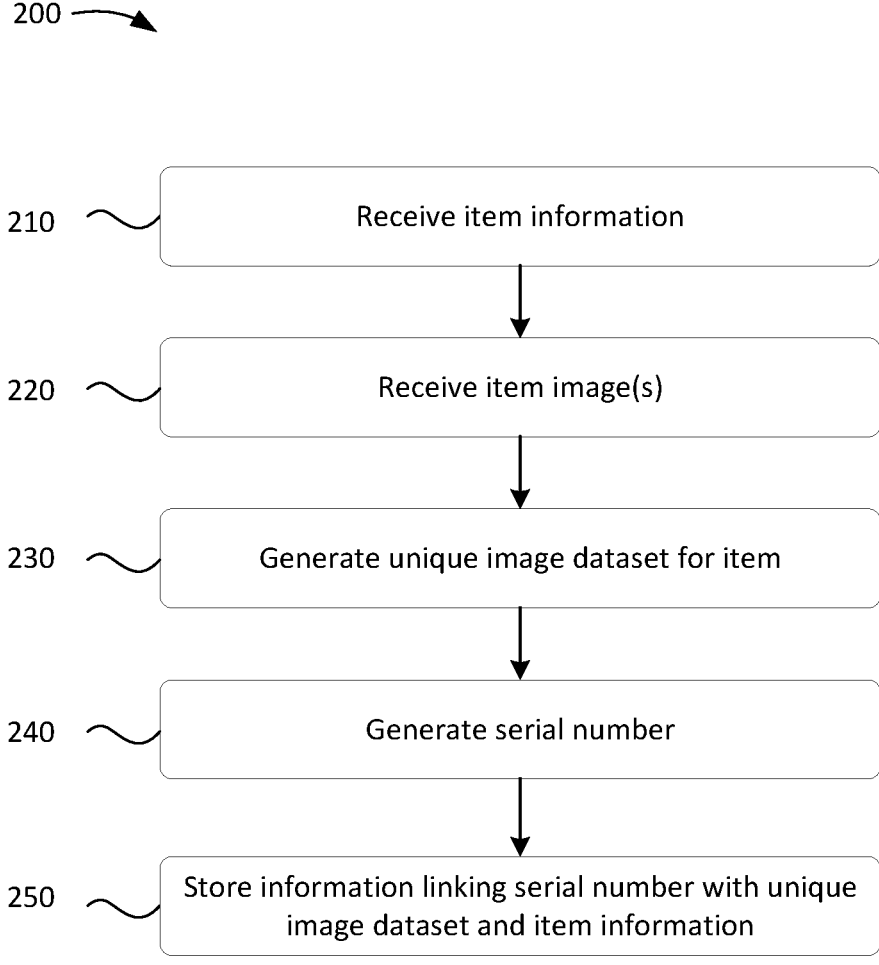
FIG. 2 illustrates an example flowchart of a process for centrally storing information regarding an item and an image dataset (which may be unique) linked to the item information.

FIG. 2 illustrates an example flowchart of a process for centrally storing information regarding an item and an image dataset (which may be unique) linked to the item information. The blocks of FIG. 2 may be implemented in the environment of FIG. 1, for example, and are described using reference numbers of elements depicted in FIG. 2. The flowchart illustrates the architecture, functionality, and operation of possible implementations of systems, methods, and computer program products according to various embodiments of the present disclosure. As described herein, process 200 of FIG. 2 may be performed by the item ID system 110 at an initial acceptance stage of an item (e.g., a mail piece, delivery item, trackable item, etc.). Additionally, or alternatively, process 200 of FIG. 2 may be performed by the item ID system 110 when an item is initially registered for tracking (e.g., at a warehouse, inventory tracking system, etc.).

As shown in FIG. 2, process 200 may include receiving item information (block 210). For example, the item ID system 110 may receive information regarding the item as part of an initial registration of the item. In some embodiments, the information regarding the item may include origin information, destination information, delivery services, delivery features, size, dimensions, weight, insurance information, etc. In some embodiments, the item ID system 110 may receive information regarding the item from a shipping label, barcode linked to item information, manual user entry, automated system information (e.g., from an automated weighing device, measuring device, etc.), or the like.

Process 200 also may include receiving item image(s) (block 220). For example, the item ID system 110 may receive, or itself capture, one or more images of the item. As an example, the item ID system 110 may receive the images from cameras implemented in a conveying system, a work surface, open space, etc. (e.g., in conjunction with item acceptance or item registration into a tracking system). In some embodiments, the images may be captured automatically or manually.

Process 200 further may include generating a unique image dataset for the item (block 230). For example, the item ID system 110 may generate a unique image dataset for the item based on the one or more item images (from block 220). As described herein, the item ID system 110 may generate the unique image dataset by applying a function to the one or more images that translates the one or more item images into a corresponding set of values. As one example, a finite state machine may be used to generate the unique image dataset based on one or more input images of the item. As another example, pixels in the one or more images may be translated to a set of values based on the pixel locations, colors, arrangement, etc. As another example, a hash function may be applied to the one or more images for conversion into a hash value. Additionally, or alternatively, any other function maybe used to translate the one or more images of the item into a set of data representing the one or more images.

Process 200 also may include generating a serial number (block 240). For example, the item ID system 110 may generate a serial number for the unique image dataset. In some embodiments, any variety of serial number generation techniques may be used, to generate a serial number of any length and format.

Process 200 further may include storing information linking serial number with unique image dataset and item information (block 250). For example, the item ID system 110 may store information linking the serial number (from block 240) with the unique image dataset (from block 230) and the item information (from block 210). In some embodiments, the unique image dataset may be encoded into serial number or associated with the serial number in another manner (e.g., a TCP/IP message container or file, such as .txt file, .xml file, etc.). In some embodiments, this container or file may be stored and used for future recognition of the item. In some embodiments, this container or file may be distributed and stored in any other system for retrieval as part of item identification.

In some embodiments, process 200 may be repeated for each item registered in a tracking system. In this way, the item ID system 110 may store different unique item datasets for each item registered in the tracking system. As described in greater detail herein, a particular item maybe later identified by matching the unique item dataset of the particular item with the unique item dataset received from an item ID requestor (e.g., from the item disposition system 120, or other requestor that requests item identification).

Figure 3:
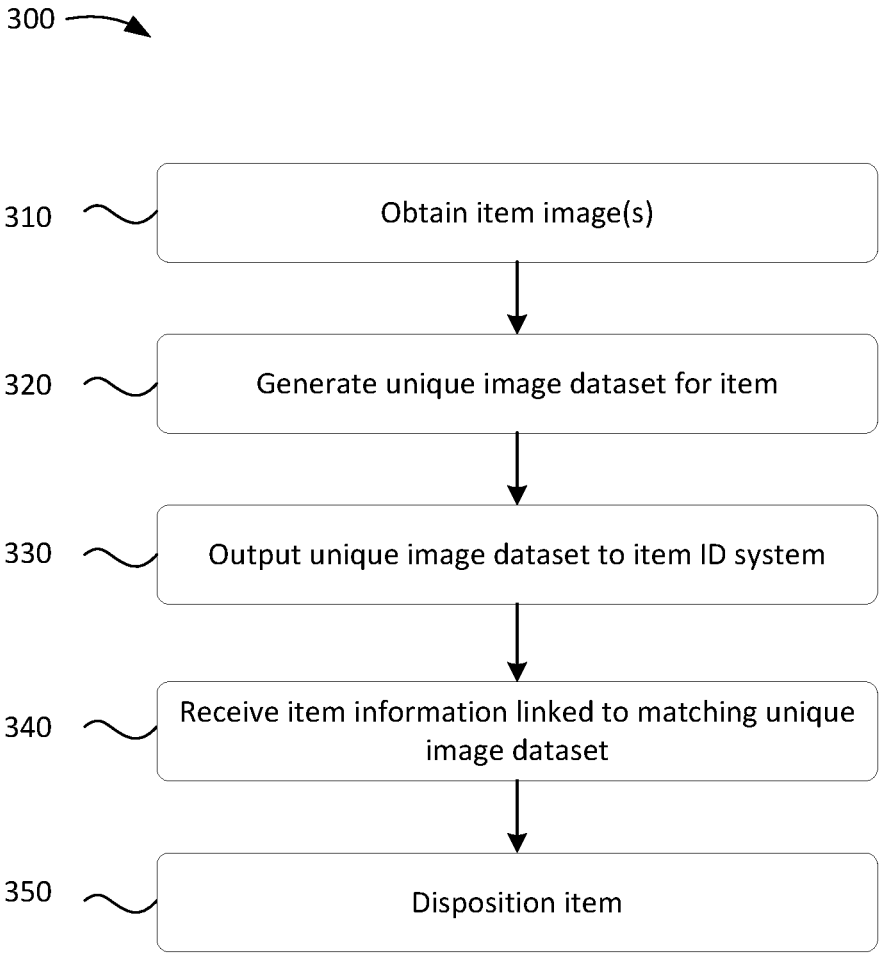
FIG. 3 illustrates example components of a device that may be used within environment of FIG. 2.

FIG. 3 illustrates an example flowchart of a process for identifying an item using a unique image dataset for item disposition. The blocks of FIG. 3 may be implemented in the environment of FIG. 1, for example, and are described using reference numbers of elements depicted in FIG. 3. The flowchart illustrates the architecture, functionality, and operation of possible implementations of systems, methods, and computer program products according to various embodiments of the present disclosure. As described herein, process 300 may be performed by an item disposition system 120 or any other system that may identify an item using the item's unique image dataset. As one example, process 300 may be performed by an item disposition system 120 that is implemented in a mail/package service or sorting station that receives an item in connection with delivery services for delivering the item to a destination.

As shown in FIG. 3, process 300 may include obtaining item image(s) (block 310). For example, the item disposition system 120 may obtain one or more images of the item (e.g., upon receipt of the item). In some embodiments, the item disposition system 120 may receive, or itself, capture the one or more images from cameras implemented conveying system, a work surface, open space, etc. (e.g., in conjunction with item receipt). In some embodiments, the images may be captured automatically or manually.

Process 300 also may include generating a unique image dataset for the item (block 320). For example, the item disposition system 120 may generate a unique image dataset for the item based on the one or more item images (from block 310). In some embodiments, the item disposition system 120 may generate a unique image dataset for the item in a similar manner as described above with respect to process block 230 of process 200 described in FIG. 2. The function and techniques used to initially generate the unique image dataset (e.g., at block 230) may be the same function as at block 320, such that both unique item datasets generate for the same item may match.

Process 300 further may include outputting the unique image dataset to the item ID system (block 330). For example, the item disposition system 120 may output the unique image dataset to the item ID system 110. In some embodiments, the item disposition system 120 may output the unique image dataset as part of a request to receive the item's identification and corresponding information that may be used for dispositioning the item. Based on receiving the request with the unique image dataset, the item ID system 110 may identify a stored unique image dataset that matches the unique image dataset received from the item disposition system 120. For example, the item ID system 110 may search through a storage of unique image datasets and locate a particular unique image dataset having the same set of values as the received unique image dataset.

Process 300 also may include receiving item information linked to matching unique image dataset (block 340). For example, the item disposition system 120 may receive, from the item ID system 110, item information linked to the matching unique image dataset. In some embodiments, the information may include the serial number, and/or any other information linked to the item (e.g., such as the item information received at process block 210 described above). Additionally, or alternatively, the item disposition system

120 may receive only the serial number, and may use the serial number to obtain the item's information (e.g., by querying the item ID system 110 or any other system which may store the item's information).

Process 300 further may include dispositioning the item (block 350). For example, the item disposition system 120 may disposition the item based on the item's identity and information (e.g., as determined at block 340). As described herein, example dispositioning may include generating sorting instructions (e.g., for an automated, partially automated, or non-automated sorting system). Additionally, or alternatively, dispositioning may include updating tracking or status information (e.g., by outputting the updated tracking or status information to the item ID system 110 in which the item ID system 110 may update the tracking or status information linked to the item, the item serial number, and/or the item's unique image dataset). Additionally, or alternatively, the dispositioning may include routing and/or delivery instructions for delivering the item to a subsequent service or processing station. Additionally, or alternatively, the dispositioning may include any other action relating to the item in which the dispositioning of the item is based on the item's identification and information. In some embodiments, the disposition of the item may be based on a set of rules that define the item's disposition based on the item's information (e.g., size, weight, routing path, origin, destination, etc.).

Figure 4:
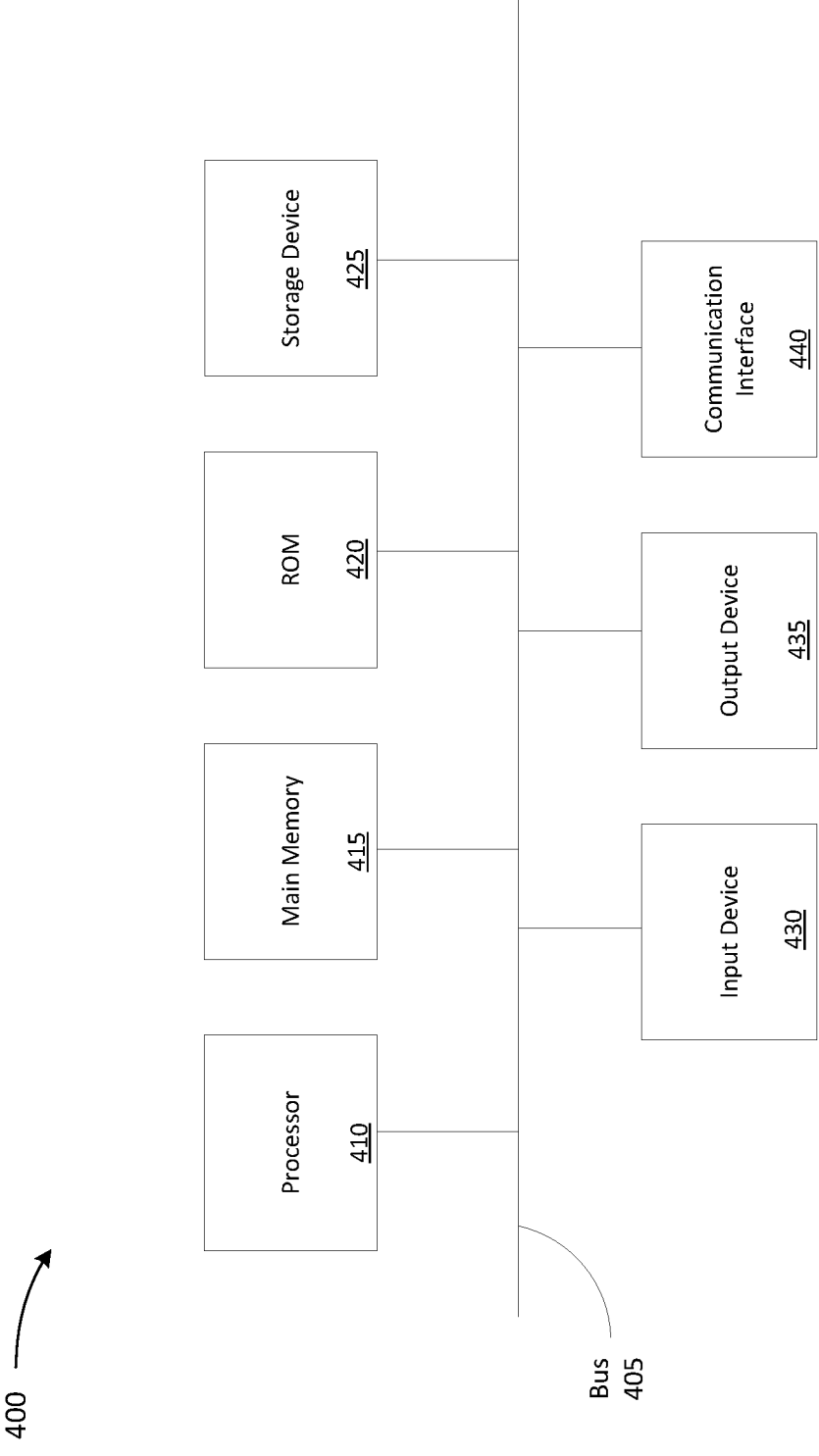
FIG. 4 illustrates example components of a device that may be used within environment of FIG. 1.

FIG. 4 illustrates example components of a device 400 that may be used within environment 100 of FIG. 1. Device 400 may correspond to the item ID system 110 and/or the item disposition system 120. Each of item ID system 110 and/or the item disposition system 120 may include one or more devices 400 and/or one or more components of device 400.

As shown in FIG. 4, device 400 may include a bus 405, a processor 410, a main memory 415, a read only memory (ROM) 420, a storage device 425, an input device 430, an output device 435, and a communication interface 440.

Bus 405 may include a path that permits communication among the components of device 400. Processor 410 may include a processor, a microprocessor, an application specific integrated circuit (ASIC), a field programmable gate array (FPGA), or another type of processor that interprets and executes instructions. Main memory 415 may include a random-access memory (RAM) or another type of dynamic storage device that stores information or instructions for execution by processor 410. ROM 420 may include a ROM device or another type of static storage device that stores static information or instructions for use by processor 410. Storage device 425 may include a magnetic storage medium, such as a hard disk drive, or a removable memory, such as a flash memory.

Input device 430 may include a component that permits an operator to input information to device 400, such as a control button, a keyboard, a keypad, or another type of input device. Output device 435 may include a component that outputs information to the operator, such as a light emitting diode (LED), a display, or another type of output device. Communication interface 440 may include any transceiver-like component that enables device 400 to communicate with other devices or networks. In some implementations, communication interface 440 may include a wireless interface, a wired interface, or a combination of a wireless interface and a wired interface. In embodiments, communication interface 440 may receiver computer readable program instructions from a network and may forward the computer readable program instructions for storage in a computer readable storage medium (e.g., storage device 425).

Device 400 may perform certain operations, as described in detail below. Device 400 may perform these operations in response to processor 410 executing software instructions contained in a computer-readable medium, such as main memory 415. A computer-readable medium may be defined as a non-transitory memory device and is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. A memory device may include memory space within a single physical storage device or memory space spread across multiple physical storage devices.

The software instructions may be read into main memory 415 from another computer-readable medium, such as storage device 425, or from another device via communication interface 440. The software instructions contained in main memory 415 may direct processor 410 to perform processes that will be described in greater detail herein. Alternatively, hardwired circuitry may be used in place of or in combination with software instructions to implement processes described herein. Thus, implementations described herein are not limited to any specific combination of hardware circuitry and software.

In some implementations, device 400 may include additional components, fewer components, different components, or differently arranged components than are shown in FIG. 4.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the disclosure may include a system, a method, and/or a computer program product at any possible technical detail level of integration. The computer program product may include a computer readable storage medium (or media) having computer readable program instructions thereon for causing a processor to carry out or execute aspects and/or processes of the present disclosure.

In embodiments, the computer readable program instructions may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on a user's computer, partly on the user's computer, as a stand-alone software package, partly on the user's computer and partly on a remote computer or entirely on the remote computer or server.

In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

In embodiments, a service provider could offer to perform the processes described herein. In this case, the service provider can create, maintain, deploy, support, etc., the computer infrastructure that performs the process steps of the disclosure for one or more customers. These customers may be, for example, any business that uses technology. In return, the service provider can receive payment from the customer(s) under a subscription and/or fee agreement and/or the service provider can receive payment from the sale of advertising content to one or more third parties.

The foregoing description provides illustration and description, but is not intended to be exhaustive or to limit the possible implementations to the precise form disclosed. Modifications and variations are possible in light of the above disclosure or may be acquired from practice of the implementations.

It will be apparent that different examples of the description provided above may be implemented in many different forms of software, firmware, and hardware in the implementations illustrated in the figures. The actual software code or specialized control hardware used to implement these examples is not limiting of the implementations. Thus, the operation and behavior of these examples were described without reference to the specific software code—it being understood that software and control hardware can be designed to implement these examples based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

While the present disclosure has been disclosed with respect to a limited number of embodiments, those skilled in the art, having the benefit of this disclosure, will appreciate numerous modifications and variations there from. It is intended that the appended claims cover such modifications and variations as fall within the true spirit and scope of the disclosure.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A computer-implemented method of identifying mail-deliverable items conveyed through a sorting system, wherein the sorting system comprises an identification system and a disposition system, the method comprising:

receiving, by the identification system, information regarding a first mail-deliverable item conveyed through an identification system, the identification system comprising a digital camera;

obtaining, by the identification system, one or more first digital images of the first mail-deliverable item from the digital camera as the first mail-deliverable item is conveyed through the identification system;

generating, by the identification system, a first set of image hash values, wherein the identification system applies a hash function to the one or more first digital images to translate the one or more first digital images into the first set of image hash values;

generating, by the identification system, a unique image dataset for the first mail-deliverable item comprising the first set of image hash values;

storing, by the identification system, information linking the unique image dataset comprising the first set of image hash values to the information regarding the first mail-deliverable item;

receiving, by the identification system and from the disposition system, a request to identify a mail-deliverable item as the mail-deliverable item is conveyed through the sorting system, wherein the request includes a second set of image hash values for the mail-deliverable item and a measured value associated with the mail-deliverable item, wherein the identification system is communicatively coupled to the disposition system through a network;

identifying, by the identification system, the mail-deliverable item conveyed through the sorting system as the first mail-deliverable item based on: receiving the request including the second set of image hash values and the measured value, comparing the first set of image hash values with the second set of image hash values to determine if there is a match between at least one image hash value of the first set of image hash values and at least another image hash value of the second set of image hash values, and comparing at least a portion of the information regarding the first mail-deliverable item with the measured value to identify the mail-deliverable item conveyed through the sorting system as the first mail-deliverable item;

providing, by the identification system and to the disposition system, the information regarding the first mail-deliverable item;

sorting, by the disposition system, the mail-deliverable item based on the information regarding the first mail-deliverable item; and routing, by the disposition system, the mail-deliverable item based on the information regarding the first mail-deliverable item;

wherein the disposition system comprises a second digital camera;

wherein the disposition system obtains one or more second digital images of the mail-deliverable item from the second digital camera as the mail-deliverable item is conveyed through the sorting system;

wherein the disposition system applies the hash function to the one or more second digital images to translate the one or more second digital images into the second set of image hash values;

wherein the disposition system determines the measured value associated with the mail-deliverable item conveyed through the sorting system; and wherein the measured value is at least one of a measured dimension associated with the mail-deliverable item conveyed through the sorting system or a measured weight of the mail-deliverable item conveyed through the sorting system.

2. The method of claim 1, wherein the storing information linking the unique image dataset to the information regarding the first mail-deliverable item comprises linking a serial number to the first mail-deliverable item; and wherein the providing, by the identification system and to the disposition system, the information regarding the first mail-deliverable item comprises providing, to the disposition system, the serial number based on the identifying the mail-deliverable item, wherein the disposition system obtains additional information regarding the first mail-deliverable item based on the serial number.

3. The method of claim 1, wherein providing, by the identification system and to the disposition system, the information regarding the first mail-deliverable item includes at least one of:

providing sorting information for the mail-deliverable item;

providing location tracking information for the mail-deliverable item;

updating status information for the mail-deliverable item;

providing rerouting information for the mail-deliverable item; or updating a service feature for the mail-deliverable item.

4. The method of claim 1, further comprising:

generating a serial number for the first mail-deliverable item, before the storing information linking the unique image dataset to the information regarding the first mail-deliverable item.

5. The method of claim 1, wherein the portion of the information regarding the first mail-deliverable item conveyed through the identification system that is compared with the measured value is determined using a measuring system or a scale.

6. The method of claim 1, wherein the information regarding the first mail-deliverable item comprises at least one of:

a sender of the first mail-deliverable item;

a recipient of the first mail-deliverable item;

an origin address of the first mail-deliverable item;

a destination address of the first mail-deliverable item;

tracking information of the first mail-deliverable item;

dimensions of the first mail-deliverable item;

a weight of the first mail-deliverable item; or a transit route of the first mail-deliverable item.

7. The method of claim 1, wherein the mail-deliverable item does not include a fluorescent ID tag.

8. A computer program product comprising a computer readable storage medium having program instructions embodied therewith, the program instructions executable by a computing device to cause the computing device to perform operations identifying mail-deliverable items conveyed through a sorting system, wherein the sorting system comprises an identification system and a disposition system, the operations comprising:

receiving, by the identification system, information regarding a first mail-deliverable item conveyed through an identification system, the identification system comprising a digital camera;

obtaining, by the identification system, one or more first digital images of the first mail-deliverable item from the digital camera as the first mail-deliverable item is conveyed through the identification system;

generating, by the identification system, a first set of image hash values, wherein the identification system applies a hash function to the one or more first digital images to translate the one or more first digital images into the first set of image hash values;

generating, by the identification system, a unique image dataset for the first mail-deliverable item comprising the first set of image hash values;

storing, by the identification system, information linking the unique image dataset comprising the first set of image hash values to the information regarding the first mail-deliverable item;

receiving, by the identification system and from the disposition system, a request to identify a mail-deliverable item, wherein the request includes a second set of image hash values for the mail-deliverable item and a measured value associated with the mail-deliverable item, wherein the identification system is communicatively coupled to the disposition system through a network;

identifying, by the identification system, the mail-deliverable item conveyed through the sorting system as the first mail-deliverable item based on: receiving the request including the second set of image hash values and the measured value, comparing the first set of image hash values with the second set of image hash values to determine if there is a match between at least one image hash value of the first set of image hash values and at least another image hash value of the second set of image hash values, and comparing at least a portion of the information regarding the first mail-deliverable item with the measured value to identify the mail-deliverable item conveyed through the sorting system as the first mail-deliverable item; and providing, by the identification system and to the disposition system, the information regarding the first mail-deliverable item;

sorting, by the disposition system, the mail-deliverable item based on the information regarding the first mail-deliverable item; and routing, by the disposition system, the mail-deliverable item based on the information regarding the first mail-deliverable item;

wherein the disposition system comprises a second digital camera;

wherein the disposition system obtains one or more second digital images of the mail-deliverable item from the second digital camera as the mail-deliverable item is conveyed through the sorting system;

wherein the disposition system applies the hash function to the one or more second digital images to translate the one or more second digital images into the second set of image hash values;

wherein the sorting system disposition the measured value associated with the mail-deliverable item conveyed through the sorting system; and wherein the measured value is at least one of a measured dimension associated with the mail-deliverable item conveyed through the sorting system or a measured weight of the mail-deliverable item conveyed through the sorting system.

9. The computer program product of claim 8, wherein the storing information linking the unique image dataset to the information regarding the first mail-deliverable item comprises linking a serial number to the first mail-deliverable item; and wherein the providing, by the identification system and to the disposition system, the information regarding the first mail-deliverable item further comprises providing, to the disposition system, the serial number based on the identifying the mail-deliverable item, wherein the disposition system obtains additional information regarding the first mail-deliverable item based on the serial number.

10. The computer program product of claim 8, wherein providing, by the identification system and to the disposition system, the information regarding the first mail-deliverable item includes at least one of:

providing sorting information for the mail-deliverable item;

providing location tracking information for the mail-deliverable item;

updating status information for the mail-deliverable item;

providing rerouting information for the mail-deliverable item; or updating a service feature for the mail-deliverable item.

11. The computer program product of claim 8, wherein the operations further comprise:

generating a serial number for the first mail-deliverable item, before the storing information linking the unique image dataset to the information regarding the first mail-deliverable item.

12. The computer program product of claim 8, wherein the portion of the information regarding the first mail-deliverable item conveyed through the identification system that is compared with the measured value that is received is determined using a measuring system or a scale.

13. The computer program product of claim 8, wherein the information regarding the first mail-deliverable item comprises at least one of:

a sender of the first mail-deliverable item;

a recipient of the first mail-deliverable item;

an origin address of the first mail-deliverable item;

a destination address of the first mail-deliverable item;

tracking information of the first mail-deliverable item;

dimensions of the first mail-deliverable item;

a weight of the first mail-deliverable item; or a transit route of the first mail-deliverable item.

14. The computer program product of claim 8, wherein the mail-deliverable item does not include a fluorescent ID tag.

15. An identification system comprising:

a digital camera; and a processor, a computer readable memory, a non-transitory computer readable storage medium associated with a computing device, and program instructions executable by the computing device to cause the computing device to perform operations identifying mail-deliverable items conveyed through a sorting system, wherein the sorting system comprises the identification system and a disposition system, and wherein the identification system is communicatively coupled to the disposition system through a network, the operations comprising:

receiving, by the identification system, information regarding a first mail-deliverable item conveyed through the identification system;

obtaining, by the identification system, one or more first digital images of the first mail-deliverable item from the digital camera as the first mail-deliverable item is conveyed through the identification system;

generating, by the identification system, a first set of image hash values, wherein the computing device applies a hash function to the one or more first digital images to translate the one or more first digital images into the first set of image hash values;

generating, by the identification system, a unique image dataset for the first mail-deliverable item comprising the first set of image hash values;

storing, by the identification system, information linking the unique image dataset comprising the first set of image hash values to the information regarding the first mail-deliverable item;

receiving, by the identification system and from the disposition system, a request to identify a mail-deliverable item, wherein the request includes a second set of image hash values for the mail-deliverable item and a measured value associated with the mail-deliverable item;

identifying, by the identification system, the mail-deliverable item conveyed through the sorting system as the first mail-deliverable item based on: receiving the request including the second set of image hash values and the measured value, comparing the first set of image hash values with the second set of image hash values to determine if there is a match between at least one image hash value of the first set of image hash values and at least another image hash value of the second set of image hash values, and comparing at least a portion of the information regarding the first mail-deliverable item with the measured value to identify the mail-deliverable item conveyed through the sorting system as the first mail-deliverable item; and providing, by the identification system and to the disposition system, the information regarding the first mail-deliverable item;

wherein the disposition system sorts the mail-deliverable item based on the information regarding the first mail-deliverable item; and wherein the disposition system routes the mail-deliverable item based on the information regarding the first mail-deliverable item;

wherein the disposition system comprises a second digital camera;

wherein the disposition system obtains one or more second digital images of the mail-deliverable item from the second digital camera as the mail-deliverable item is conveyed through the sorting system;

wherein the disposition system applies the hash function to the one or more second digital images to translate the one or more second digital images into the second set of image hash values;

wherein the disposition system determines the measured value associated with the mail-deliverable item conveyed through the sorting system; and wherein the measured value is at least one of a measured dimension associated with the mail-deliverable item conveyed through the sorting system or a measured weight of the mail-deliverable item conveyed through the sorting system.

16. The identification system of claim 15, wherein the storing information linking the unique image dataset to the information regarding the first mail-deliverable item comprises linking a serial number to the first mail-deliverable item; and wherein the providing, by the identification system and to the disposition system, the information regarding the first mail-deliverable item further comprises providing, to the disposition system, the serial number based on the identifying the mail-deliverable item, wherein the disposition system obtains additional information regarding the first mail-deliverable item based on the serial number.

17. The identification system of claim 15, wherein providing, by the identification system and to the disposition system, the information regarding the first mail-deliverable item includes at least one of:

providing sorting information for the mail-deliverable item;

providing location tracking information for the mail-deliverable item;

updating status information for the mail-deliverable item;

providing rerouting information for the mail-deliverable item; or updating a service feature for the mail-deliverable item.

18. The identification system of claim 15, wherein the operations further comprise:

generating a serial number for the first mail-deliverable item, before the storing information linking the unique image dataset to the information regarding the first mail-deliverable item.

19. The identification system of claim 15, wherein the portion of the information regarding the first mail-deliverable item conveyed through the identification system that is compared with the measured value is determined using a measuring system or a scale.

20. The identification system of claim 15, wherein the information regarding the first mail-deliverable item comprises at least one of:

a sender of the first mail-deliverable item;

a recipient of the first mail-deliverable item;

an origin address of the first mail-deliverable item;

a destination address of the first mail-deliverable item;

tracking information of the first mail-deliverable item;

dimensions of the first mail-deliverable item;

a weight of the first mail-deliverable item; or a transit route of the first mail-deliverable item.

\* \* \* \* \*